United States Patent Office 3,140,260
Patented July 7, 1964

3,140,260
CORROSION INHIBITION
Gerald L. Foster and Billy D. Oakes, Tulsa, Okla., assignors to The Dow Chemical Company, Midland, Mich., a corporation of Delaware
No Drawing. Filed Jan. 8, 1959, Ser. No. 785,555
7 Claims. (Cl. 252—151)

The present invention relates to corrosion inhibition and more particularly relates to a new novel composition for the prevention of the corrosion of metallic surfaces under non-oxidizing acidic conditions.

The acetylenic sufides are known to be very effective corrosion inhibitors in the field of acid treating metal articles. However, they are so toxic that very little use can be made of them since most people refuse to work with such toxic materials.

It is an object of the present invention to provide a corrosion inhibitor for metallic surfaces under non-oxidizing acidic conditions which does not deposit a residue on the metallic surface. Another object of the present invention is to provide in a concentrate form a corrosion inhibitor composition which is safe and relatively non-toxic to handle. These and other objects will become apparent to those skilled in the art from the following specification and claims.

It has now been found that metal corrosion by non-oxidizing acids may be inhibited by adding to an aqueous acidic corrosive solution a composition comprising an acetylenic sulfide, an alkyl phosphate ester and/or a surface-active agent. Inhibition of corrosion has been obtained at temperatures as high as 240° Fahrenheit. Good results are obtained when the corrosion-inhibiting composition is employed in an amount of from about 0.01 percent to about 1.0 percent by volume of the ultimate mixture.

The acetylenic sulfides (also referred to as di(acetylenic) sulfides, which may be employed in accordance with the present invention are those compounds having the following general formula $$HC \equiv C - R - S - R - C \equiv CH$$

wherein R represents a lower alkylene radical having from 1 to 4 carbon atoms inclusive. Some of such compounds are dipropargyl sulfide, bis (1-methyl-2-propynyl)sulfide and bis (2-ethynyl-2-propyl)sulfide, and the like.

The alkyl phosphate esters which may be employed in accordance with the present invention are, for example, those esters having the general formula

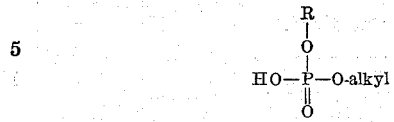

wherein R represents hydrogen or alkyl. Some of the esters which have been employed successfully in accordance with the present invention are mono-iso-octyl acid othophosphate, and diisooctyl acid orthophosphase and mixtures thereof, the mono-ethyl acid orthophosphate and diethyl acid orthophosphate and mixtures thereof.

Various surface-active agents may be employed in accordance with the present invention as, for example, the anionic and nonionic organic dispersing, emulsifying and/or wetting agents. Some of such nonionic surface-active agents are the condensation product of alkylphenols with alkylene oxides, for examples nonylphenol with 10 to 30 moles of ethylene oxide alkylated aryl polyether alcohols. Some of the anionic surface active agents are, for example, ammonium isopropyl-benzene parasulfonate, dioctyl ester of sodium sulfosuccinic acid, sodium sulfate derivative of 7-ethyl-2-methyl-undecanol-4.

The following examples illustrate the present invention but are not to be construed as limiting:

EXAMPLE 1

0.57 gallon of a condensation product of nonylphenol with 15 moles of ethylene oxide and 1.14 gallons of mono-isooctyl acid ortho phosphate were added with stirring to 707 gallons of water and thereafter there was added 2.20 gallons of dipropargyl sulfide. To this mixture there was added with stirring 293 gallons of 31 percent HCl. As a result of these operations there was obtained 1000 gallons of a 10 percent hydrochloric acid solution containing 0.4 percent by volume of an inhibitor composition consisting of 4 parts by volume of dipropargyl sulfide, 2 parts by volume of phosphate ester and 1 part by volume of surfactant.

EXAMPLE 2

In a manner of Example 1, 150 milliliter portions of 15 percent hydrochloric acid were prepared containing 0.4 and 0.29 percent by volume of dipropargyl sulfide and

*Table I*

| Conc. Dipropargyl Sulfide (Percent by Volume) | Percent by Volume of Additives | Length of Corrosion Rate | | Deposit Formation (Visually Determined) |
|---|---|---|---|---|
| | | Test (hrs.) | Lbs./ft.²/day | |
| 0.4 | None | 6 | 0.0082 | Heavy yellow deposit. |
| 0.4 | None | 16 | 0.48 | Do. |
| 0.4 | ª 0.07 | 6 | 0.0057 | Some yellow deposit. |
| 0.4 | ª 0.07 | 16 | 0.0025 | Do. |
| 0.4 | ᵇ 0.14 | 6 | 0.0011 | Do. |
| 0.4 | ᵇ 0.14 | 16 | 0.0013 | Do. |
| 0.29 | ª 0.07+ᵇ 0.14 | 6 | 0.019 | Negligible deposit. |
| 0.29 | ª 0.07+ᵇ 0.14 | 16 | 0.028 | Do. |
| 0.4 | ª 0.1 +ᵇ 0.2 | 16 | 0.0033 | Do. |
| *0.29 | ᶜ 0.07+ᵇ 0.14 | 6 | 0.017 | Do. |
| *0.29 | ᵈ 0.07+ᵇ 0.14 | 6 | 0.031 | Do. |
| *0.29 | ᵉ 0.07+ᵇ 0.14 | 6 | 0.029 | Do. |
| *0.29 | ᶠ 0.07+ᵇ 0.14 | 6 | 0.023 | Do. |
| *0.29 | ᵍ 0.07+ᵇ 0.14 | 6 | 0.036 | Do. |
| *0.29 | ʰ 0.07+ᵇ 0.14 | 6 | 0.011 | Do. |
| 0.29 | ᶜ 0.07+ᵇ 0.14 | 6 | 0.014 | Do. |
| 0.29 | ᵍ 0.07+ᵇ 0.14 | 6 | 0.036 | Do. |

ª Nonylphenol condensed with 15 moles ethylene oxide per molecule.
ᵇ Monoisooctyl acid orthophosphate.
ᶜ The reaction product of 23 moles of ethylene oxides and 16 moles of propylene oxide with isopropanolamine.
ᵈ Dioctyl ester of sodium sulfo succinic acid.
ᵉ Sodium sulfate derivative of ethyl-2-methyl-undecanol-4.
ᶠ Ricinoleic acid +40 moles of ethylene oxide.
ᵍ Alkylated aryl polyether alcohol (Triton X-100).
ʰ Alkyl phenyl ether of polyethylene glycol.
*Each of the ingredients in these tests were added separately to the acid.

various amounts of surfactant and/or phosphate ester. These aliquot portions were employed to test the corrosion inhibition and deposit formation at 200° Fahrenheit of the inhibitor composition on one-quarter sections of 1 inch segments of 2 inch O.D. pipe having a wall thickness of 0.375 inch. The pipe material was API N80 steel. The above table lists the compositions employed and the results obtained.

EXAMPLE 3

In the manner of Example 2 in a test conducted for 16 hours at 185° F. on AISI 1020 mild steel employing various phosphate esters and 0.4 percent of dipropargyl sulfide and 0.1 percent nonylphenol condensed with 15 moles of ethylene oxide in 15 percent hydrochloric acid the following results were obtained.

Table II

| 0.2 Percent Various Phosphate Esters | Corrosion Rate (lbs./ft.²/day) | Deposit Formation |
|---|---|---|
| Mono-iso-octyl acid orthophosphate | 0.0077 | None. |
| Mono-diiso-octyl acid orthophosphate.ᵃ | 0.0069 | Do. |
| Mono-ethyl acid orthophosphate | 0.0075 | Light yellow film. |
| Mono-diethyl acid orthophosphate ᵇ | 0.0067 | Do. |

ᵃ Mixture of the mono-iso-octyl and the diiso-octyl acid orthophosphate.
ᵇ Mixture of mono-ethyl and diethyl acid orthophosphate.

This application is a continuation-in-part of our co-pending application, Serial No. 699,208, filed in the United States Patent Office November 27, 1957, now abandoned.

We claim:

1. A corrosion inhibiting composition comprising a dialkynyl sulfide having from 3 to 6 carbon atoms in each alkynyl radical and from 0.012 to 0.75 part by volume based on said sulfide of a surface-active material selected from the group consisting of anionic and non-ionic agents.

2. A corrosion inhibiting composition comprising a dialkynyl sulfide having from 3 to 6 carbon atoms in each alkynyl radical and from 0.25 to 1 part by volume based on said sulfide of an alkyl phosphate ester having the formula

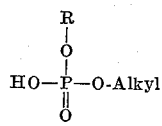

wherein R represents a member selected from the group consisting of hydrogen and alkyl; said alkyl radicals having from 2 to 8 carbon atoms inclusive.

3. A corrosion inhibiting composition comprising a dialkynyl sulfide having from 3 to 6 carbon atoms in each alkynyl radical and at least one of from 0.25 to 1 part by volume of an alkyl phosphate ester having the formula

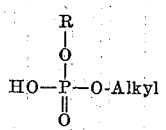

wherein R represents a member selected from the group consisting of hydrogen and alkyl, said alkyl radicals having from 2 to 8 carbon atoms, inclusive, and from 0.012 to about 0.75 part by volume of a surface-active material selected from the group consisting of anionic and nonionic agents, said proportions being based on said sulfide.

4. A corrosion-inhibiting composition comprising four parts by volume of dipropargyl sulfide, from 1 to 4 parts by volume of an alkyl phosphate ester having the formula

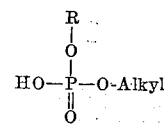

wherein R represents a member selected from the group consisting of hydrogen and alkyl, said alkyl radicals having from 2 to 8 carbon atoms, inclusive, from 0.05 to 3 parts by volume of a surface-active material selected from the group consisting of anionic and nonionic agents and from 0 to 1500 parts by volume of water.

5. A corrosion-inhibited, aqueous, non-oxidizing acid composition comprising an aqueous solution of a non-oxidizing acid containing from 0.01 to 1.0 percent by volume of a concentrate consisting of 4 parts by volume of dipropargyl sulfide, from 1 to 4 parts by volume of an alkyl phosphate ester having the formula

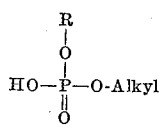

wherein R represents a member selected from the group consisting of hydrogen and alkyl, said alkyl radicals having from 2 to 8 carbon atoms, inclusive, and from 0.05 to 3 parts by volume of an non-ionic surface-active agent, said surface-active agent being a condensation product of an alkylphenol and from 10 to 30 molar equivalents of alkylene oxide.

6. A corrosion-inhibited aqueous non-oxidizing acid composition comprising an aqueous solution of a non-oxidizing acid containing from 0.01 to 1.0 percent by volume of a concentrate consisting of 4 parts by volume of dipropargyl sulfide from 1 to 4 parts by volume of an alkyl phosphate ester having the formula

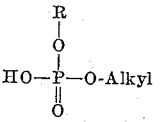

wherein R represents a member selected from the group consisting of hydrogen and alkyl, said alkyl radicals having from 2 to 8 carbon atoms, inclusive, and from 0.05 to 3 parts by volume of an anionic surface-active agent, said surface-active agent being an ammonium alkylbenzene parasulfonate.

7. A method for the inhibition of corrosion of ferrous metals by aqueous non-oxidizing acids in contact therewith which comprises admixing with such acid from 0.01 to 1.0 percent by volume of a composition containing 4 parts by volume of dipropargyl sulfide, 1 to 4 parts by volume of an alkyl phosphate ester having the formula

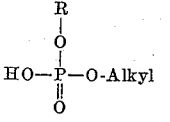

wherein R represents a member selected from the group consisting of hydrogen and alkyl, said alkyl radicals having from 2 to 8 carbon atoms, inclusive, and from 0.05 to 3 parts by volume of a surface-active material selected from the group consisting of anionic and nonionic agents.

References Cited in the file of this patent
UNITED STATES PATENTS

| 2,285,853 | Downing et al. | June 9, 1942 |
| 2,707,714 | Conklin et al. | May 3, 1955 |
| 2,814,593 | Beiswanger et al. | Nov. 25, 1957 |
| 2,880,180 | Foster et al. | Mar. 31, 1959 |
| 2,901,438 | Rogers | Aug. 25, 1959 |